US011209651B2

(12) United States Patent
Welch

(10) Patent No.: US 11,209,651 B2
(45) Date of Patent: *Dec. 28, 2021

(54) MULTI-FOCAL DISPLAY SYSTEM AND METHOD

(71) Applicant: Magic Leap, Inc., Plantation, FL (US)

(72) Inventor: William Hudson Welch, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,315

(22) Filed: Jul. 2, 2019

(65) Prior Publication Data

US 2019/0339526 A1     Nov. 7, 2019

Related U.S. Application Data

(63) Continuation of application No. 14/611,154, filed on Jan. 30, 2015, now Pat. No. 10,386,636.

(Continued)

(51) Int. Cl.
*G02B 27/01*     (2006.01)
*G02B 27/00*     (2006.01)
(Continued)

(52) U.S. Cl.
CPC ..... *G02B 27/0172* (2013.01); *G02B 27/0093* (2013.01); *G02B 30/52* (2020.01);
(Continued)

(58) Field of Classification Search
CPC .......... G02B 27/0172; G02B 2027/014; G02B 2027/0127; G02B 2027/0185;
(Continued)

(56) References Cited

U.S. PATENT DOCUMENTS

| 4,472,737 A | 9/1984 | Iwasaki |
| 4,909,613 A | 3/1990 | Kikuchi |

(Continued)

FOREIGN PATENT DOCUMENTS

| AU | 2015266585 | 5/2015 |
| AU | 2015266670 | 5/2015 |

(Continued)

OTHER PUBLICATIONS

Gordon D. Love, David M. Hoffman, Philip J.W. Hands, James Gao, Andrew K. Kirby and Martin S. Banks, "High-speed switchable lens enables the development of a volumetric stereoscopic display", Optics Express, vol. 17, No. 18, p. 15716-15725, 2009 (Year: 2009).*

(Continued)

*Primary Examiner* — Ayman A Abaza
(74) *Attorney, Agent, or Firm* — Vista IP Law Group, LLP

(57) ABSTRACT

A display system includes a light projection device operatively coupled to an image source that generates image data. The system also includes a composite variable focus element (VFE) assembly operatively coupled to the light projection device, the composite VFE assembly comprising a first VFE arranged in series with a second VFE to provide image frames corresponding to the image data for display. The first VFE is configured to switch between focal states within a first focal range and with a first switching response time. The second VFE is configured to switch between focal states within a second focal range and with a second switching response time. The first focal range is greater than the second focal range. The first switching response time is slower than the second switching response time.

15 Claims, 3 Drawing Sheets

Related U.S. Application Data

(60) Provisional application No. 61/934,565, filed on Jan. 31, 2014.

(51) Int. Cl.
  *G02B 30/52* (2020.01)
  *H04N 13/383* (2018.01)
  *G02B 15/00* (2006.01)

(52) U.S. Cl.
  CPC ...... *G02B 15/00* (2013.01); *G02B 2027/0127* (2013.01); *G02B 2027/0185* (2013.01); *H04N 13/383* (2018.05)

(58) Field of Classification Search
  CPC .. G02B 27/017; G02B 27/0093; G02B 30/52; G02B 15/00; G06F 3/011; G06T 19/006; G06K 9/00671; H04N 13/0239; H04N 13/044; H04N 13/0014; H04N 13/383
  USPC ...................................................... 348/46, 55
  See application file for complete search history.

(56) References Cited

U.S. PATENT DOCUMENTS

| | | | |
|---|---|---|---|
| 5,729,242 | A | 3/1998 | Margerum et al. |
| 5,751,494 | A | 5/1998 | Takahashi |
| 5,764,317 | A | 6/1998 | Sadovnik et al. |
| 5,880,711 | A | 3/1999 | Tamada |
| 6,046,720 | A | 4/2000 | Melville et al. |
| 6,069,650 | A | 5/2000 | Battersby |
| 6,120,538 | A | 9/2000 | Rizzo et al. |
| 6,504,629 | B1 | 1/2003 | Popovich et al. |
| 7,077,523 | B2 | 7/2006 | Seo et al. |
| 7,555,333 | B2 | 6/2009 | Wang et al. |
| 7,616,382 | B2 | 11/2009 | Inoguchi et al. |
| 7,784,697 | B2 | 8/2010 | Johnston et al. |
| 8,248,458 | B2 | 8/2012 | Schowengerdt et al. |
| 8,259,164 | B2 | 9/2012 | Saito et al. |
| 8,317,330 | B2 | 11/2012 | Yamazaki et al. |
| 8,384,999 | B1 | 2/2013 | Crosby et al. |
| 8,757,812 | B2 | 6/2014 | Melville et al. |
| 9,348,143 | B2 | 5/2016 | Gao et al. |
| 9,740,006 | B2 | 8/2017 | Gao |
| 9,846,967 | B2 | 12/2017 | Schowengerdt |
| 9,857,591 | B2 | 1/2018 | Welch et al. |
| 9,915,824 | B2 | 3/2018 | Schowengerdt et al. |
| 10,156,722 | B2 | 12/2018 | Gao et al. |
| 10,234,687 | B2 | 3/2019 | Welch et al. |
| 10,317,690 | B2 | 6/2019 | Cheng |
| 10,848,740 | B2 | 11/2020 | Li et al. |
| 2001/0013960 | A1 | 8/2001 | Popovich et al. |
| 2002/0163482 | A1 | 11/2002 | Sullivan |
| 2003/0020879 | A1 | 1/2003 | Sonehara |
| 2004/0227703 | A1 | 11/2004 | Lamvik et al. |
| 2006/0012851 | A1 | 1/2006 | Wu et al. |
| 2006/0028400 | A1 | 2/2006 | Lapstun et al. |
| 2006/0072843 | A1 | 4/2006 | Johnston |
| 2006/0120706 | A1 | 6/2006 | Cho et al. |
| 2008/0204394 | A1 | 8/2008 | Cho |
| 2008/0259463 | A1 | 10/2008 | Shepherd |
| 2008/0316610 | A1 | 12/2008 | Dobrusskin |
| 2009/0040138 | A1 | 2/2009 | Takahashi et al. |
| 2009/0316116 | A1 | 12/2009 | Melville et al. |
| 2010/0149073 | A1 | 6/2010 | Chaum et al. |
| 2010/0202054 | A1 | 8/2010 | Niederer |
| 2010/0289970 | A1 | 11/2010 | Watanabe |
| 2011/0075257 | A1* | 3/2011 | Hua ...................... H04N 13/383 359/464 |
| 2011/0199582 | A1 | 8/2011 | Kuriki |
| 2012/0075534 | A1 | 3/2012 | Katz et al. |
| 2012/0081800 | A1 | 4/2012 | Cheng et al. |
| 2012/0105310 | A1 | 5/2012 | Sverdrup et al. |
| 2012/0113092 | A1* | 5/2012 | Bar-Zeev ............. G06T 19/006 345/419 |
| 2012/0162549 | A1 | 6/2012 | Gao et al. |
| 2012/0192991 | A1 | 8/2012 | Gupta et al. |
| 2013/0050832 | A1 | 2/2013 | Tohara et al. |
| 2013/0128230 | A1* | 5/2013 | Macnamara ......... G02B 5/1876 353/7 |
| 2013/0176628 | A1 | 7/2013 | Batchko et al. |
| 2013/0187836 | A1 | 7/2013 | Cheng et al. |
| 2013/0265647 | A1 | 10/2013 | Kern |
| 2013/0300635 | A1 | 11/2013 | White et al. |
| 2014/0009845 | A1 | 1/2014 | Cheng et al. |
| 2014/0035959 | A1 | 2/2014 | Lapstun |
| 2014/0063055 | A1 | 3/2014 | Osterhout et al. |
| 2014/0071539 | A1 | 3/2014 | Gao |
| 2014/0111616 | A1 | 4/2014 | Blayvas |
| 2014/0132501 | A1 | 5/2014 | Choi et al. |
| 2014/0168034 | A1 | 6/2014 | Luebke et al. |
| 2014/0184477 | A1 | 7/2014 | Hino et al. |
| 2014/0192078 | A1 | 7/2014 | Gilbert et al. |
| 2014/0266990 | A1 | 9/2014 | Makino et al. |
| 2015/0035880 | A1 | 2/2015 | Heide et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0234191 | A1 | 8/2015 | Schowengerdt |
| 2015/0248012 | A1 | 9/2015 | Schowengerdt |
| 2015/0277129 | A1* | 10/2015 | Hua ...................... G02B 30/00 359/462 |
| 2015/0346490 | A1 | 12/2015 | Tekolset et al. |
| 2015/0346495 | A1 | 12/2015 | Welch et al. |
| 2016/0011419 | A1 | 1/2016 | Gao |

FOREIGN PATENT DOCUMENTS

| | | |
|---|---|---|
| EP | 0785457 A2 | 7/1997 |
| EP | 0785457 A3 | 7/1997 |
| EP | 1962130 A2 | 8/2008 |
| JP | 8-166559 | 6/1996 |
| JP | 2002-116410 | 4/2002 |
| JP | 2007-514190 | 5/2007 |
| JP | 2010-008948 | 1/2010 |
| JP | 2014-505381 | 2/2014 |
| JP | 2014-092696 | 5/2014 |
| KR | 10-2008-0079005 | 8/2008 |
| KR | 10-2013-0139280 | 12/2013 |
| WO | WO 02/086590 | 10/2002 |
| WO | WO 2006017771 | 2/2006 |
| WO | WO 2006/070308 | 7/2006 |
| WO | WO 20090014525 | 1/2009 |
| WO | WO 2011134169 | 11/2011 |
| WO | WO 2012/088478 | 6/2012 |
| WO | WO 2014/062912 | 4/2014 |
| WO | WO 2014053194 | 4/2014 |

OTHER PUBLICATIONS

Non-Final Office Action for U.S. Appl. No. 14/611,154, dated Mar. 28, 2017.
Final Office Action dated Jul. 26, 2017 for U.S. Appl. No. 14/611,154.
Response to Non-Final Office Action filed Jun. 28, 2017 for U.S. Appl. No. 14/611,154 7.
Response to Final Office Action filed Oct. 26, 2017 for U.S. Appl. No. 14/611,154.
Non-Final Office Action dated Dec. 26, 2017 for U.S. Appl. No. 14/611,154.
Response to Office Action filed Mar. 23, 2018 for U.S. Appl. No. 14/611,154.
Final Office Action dated Apr. 30, 2018 for U.S. Appl. No. 14/611,154.
Response to Final office action filed Jul. 30, 2018 for U.S. Appl. No. 14/611,154.
Non Final Office Action dated Dec. 4, 2018 for U.S. Appl. No. 14/611,154.
Response to Office action filed Mar. 4, 2019 for U.S. Appl. No. 14/611,154.
Response to 2nd Office Action filed Mar. 20, 2019 for Chinese application No. 201580017627.0, in Chinese language only.
Response to Examination Report filed Mar. 22, 2019 for Australian application No. 2015266670.

(56) References Cited

OTHER PUBLICATIONS

Notice of Allowance dated Apr. 1, 2019 for Japanese Patent Application No. 2016-549247.
Office Action dated Mar. 15, 2019 for Japanese Application No. 2016-570027 with English Translation from foreign associate.
Notice of Allowance dated Apr. 9, 2019 for U.S. Appl. No. 14/611,154.
Office Action dated Apr. 1, 2019 for Japanese Application No. 2016-570034 with English Translation from foreign associate.
Office Action dated Mar. 1, 2019 for Chinese Patent Application No. 201580041033.3, including translation provided by Chinese associate.
Response to OA filed Jul. 10, 2019 for Chinese Patent Application No. 201580041033.3, no English translation provided by Chinese associate, only amend claims in English.
Penultimate Office Action dated Aug. 6, 2019 for Japanese Application No. 2016-570027 with English Translation from foreign associate, 5 pages.
Response to OA filed Aug. 14, 2019 for Chinese Patent Application No. 201580041059.8, no English translation provided by Chinese associate, only amend claims in English, 80 pages.
Response to OA filed Aug. 23, 2019 for Chinese Patent Application No. 201580017627.0, no English translation provided by Chinese associate, 5 pgs.
Penultimate Office Action dated Aug. 1, 2019 for Japanese Application No. 2016-570034 with English Translation from foreign associate, 4 pages.
Amendment Response to OA filed for U.S. Appl. No. 16/261,455 dated Aug. 29, 2019.
Examination Report for European Application No. 15743704.7 dated Aug. 1, 2019, 6 pages.
Examination Report for New Zealand Application No. 727361 dated Sep. 13, 2019, 3 pages.
Examination Report for Australian Application No. 2015266585 dated Sep. 18, 2019, 4 pages.
Response to Penultimate Office Action filed Oct. 29, 2019, for Japanese Application No. 2016-570034 no English Translation, 3 pages.
Examination Report for New Zealand Application No. 727365 dated Oct. 31, 2019, 5 pages.
PCT International Search Report and Written Opinion of the International Searching Authority for PCT/US15/13993, Applicant Magic Leap, Inc., dated Jun. 10, 2015 (7 pages).
Non-Final Office Action for U.S. Appl. No. 14/611,162, dated Dec. 7, 2016.
Final Office Action for U.S. Appl. No. 14/611,162, dated Jul. 24, 2017.
PCT International Search Report and Written Opinion for International Appln. No. PCT/US15/13998, Applicant Magic Leap, Inc., dated May 1, 2015, 9 pages.
Non-Final Office Action for U.S. Appl. No. 14/726,429, dated Sep. 2, 2016.
Final Office Action for U.S. Appl. No. 14/726,429, dated May 17, 2017.
PCT International Search Report and Written Opinion for International Appln. No. PCT/US15/33416, Applicant Magic Leap, Inc., dated Oct. 26, 2015, 12 pages.
Hua, et al. "An Optical See-through Multi-Focal-Plane Stereoscopic Display Prototype Enabling Nearly-Correct Focus Cues," Stereoscopic Displays and Applications XXIV, Proc, of SPIE-IS&T Electronic Imaging, SPIE vol. 8648, 86481A, Mar. 12, 2013. doi: 10.1117/12.200511/.
Hu, Xinda. "Development Of The Depth-Fused Multi-Focal-Plane Display Technology," The University of Arizona, 2014.
Cheng, et al. "Design of a wide-angle, lightweight head-mounted display using free-form optics tiling," Optics Letters, vol. 36, No. 11, Jun. 1, 2011,2098-2100.
Cheng, et al. "Light field head-mounted display with correct focus cue using micro structure array," Chinese Optics Letters, 12(6), Jun. 10, 2014, 060010.
Hu, et al. "High-resolution optical see-through multi-focal-plane head-mounted display using freeform optics," Optics Express, 22 (11),Jun. 2, 2014,13896-13903. OI: 10.1364/0E.22.013896.
Hu, et al. "A depth-fused multi-focal-plane display prototype enabling focus cues in stereoscopic displays," SID 11 Digest, 2011, 691-694.
Hu, et al. "Design of an optical see-through multi-focal-plane stereoscopic 3D display using freeform prisms," FiO/LS Technical Digest, 2012.
Hu, et al. "Design and assessment of a depth fused multi-focal-plane display prototype," Journal of display technology, 10 (4), Apr. 2014, 308-316.
PCT International Search Report and Written Opinion for International Appln. No. PCT/US15/33412, Applicant Magic Leap, Inc., dated Oct. 26, 2015, 13 pages.
Non-Final Office Action for U.S. Appl. No. 14/726,396, dated Mar. 15, 2017.
Final Office Action for U.S. Appl. No. 14/726,396, dated Aug. 16, 2017.
Response to Final Office Action for U.S. Appl. No. 14/726,429, filed Aug. 17, 2017.
Response to Non-Final Office Action for U.S. Appl. No. 14/611,162, filed Apr. 7, 2017.
Supplemental Response for U.S. Appl. No. 14/726,396, dated Feb. 21, 2017.
Response to Non-Final Office Action for U.S. Appl. No. 14/726,396, filed Jun. 15, 2017.
Extended European Search Report for EP Application No. 15743704.7 dated Sep. 8, 2017.
Schowengerdt, B., et al., "3D Displays Using Scanning Laser Projection," Department of Mechanical Engineering, University of Washington, ISSN 0097-966XX/12/4302, dated 2012 (4 pages).
Notice of Allowance for U.S. Appl. No. 14/726,429 dated Sep. 13, 2017.
Extended European Search Report for EP Application No. 15743225.3 dated Sep. 19, 2017.
Amendment after Final Office Action filed Sep. 22, 2017 for U.S. Appl. No. 14/611,162.
Advisory Action dated Oct. 26, 2017 for U.S. Appl. No. 14/611,162.
Response to Non Final Office Action filed Feb. 28, 2017 for U.S. Appl. No. 14/726,429.
Response to Final Office Action filed Nov. 16, 2017 for U.S. Appl. No. 14/726,396.
Amendment and Response accompanying RCE filed Nov. 22, 2017 for U.S. Appl. No. 14/611,162.
Amended Claims filed in EP Application No. 15799569.7 dated Dec. 30, 2016.
Non-Final Office Action filed Dec. 21, 2017 for U.S. Appl. No. 14/726,396.
Extended European Search Report for EP Appln. No. 15799569.7 dated Jan. 18, 2018.
Extended European Search Report for EP Appln. No. 15799774.3 dated Jan. 2, 2018.
Shiro Suyama et al., "Three-Dimensional Display System with Dual-Frequency Liquid-Crystal Varifocal Lens", Jpn J. Appl. Phys., vol. 39 (2000) pp. 480-484, Part1, No. 2A, Feb. 2000, 6 pp.
Amendment after Non-Final Office Action for U.S. Appl. No. 14/726,396 dated Mar. 21, 2018.
Response to Extended EP Search report filed Mar. 29, 2018 for EP application No. 15743704.7.
Office action dated Feb. 2, 2018 for Chinese application No. 201580041059.8, office action is in Chinese language with a translation provided by the foreign associate.
Response to Extended EP Search report filed Apr. 12, 2018 for EP application No. 15743225.3.
Non-Final Office Action for U.S. Appl. No. 15/819,887, dated Apr. 19, 2018.
Office action dated Apr. 3, 2018 for Chinese application No. 201580017627.0, in Chinese language with English translation provided by the foreign associate.
Amendment after Non-Final Office Action for U.S. Appl. No. 15/819,887 dated Jul. 19, 2018.
Notice of Allowance for U.S. Appl. No. 14/726,396 dated Jul. 2, 2018.

(56) References Cited

OTHER PUBLICATIONS

Response to Extended European Search Report filed Jul. 30, 18 for EP application No. 15799774.3.
Response to Extended European Search Report dated Aug. 14, 2018 for EP application No. 15799569.7, 11 pages.
Office Action dated Jul. 20, 2018 for Chinese Application No. 201580017626.6, including translation provided by Chinese associate.
Notice of Allowance dated Sep. 10, 2018 for U.S. Appl. No. 15/819,887.
Office Action dated Sep. 25, 2018 for Japanese Application No. 2016-549247 with English Translation from foreign associate.
Office Action dated Oct. 6, 2018 for Australian Application No. 2015210704.
Notice of Allowance for U.S. Appl. No. 14/726,396 dated Sep. 28, 2018.
Office Action dated Sep. 21, 2018 for Japanese Application No. 2016-549347, including translation provided by Japanese associate.
Office Action dated Sep. 7, 2018 for Australian Application No. 2015266670.
Office Action dated Oct. 8, 2018 for Chinese Patent Appln. No. 20150041033.3, in Chinese language only.
Office Action response filed Dec. 3, 2018 for Chinese Appln. No. 201580017626.6, in Chinese language with claims in English.
Response to Office Action filed Jun. 13, 2018 for Chinese application No. 201580041059.8, in Chinese language with claims in English.
Office action dated Oct. 15, 2018 for Chinese application No. 201580041059.8, in Chinese language with a translation provided by the foreign associate.
Response to Office Action filed Nov. 29, 2018 for Japanese Application No. 2016-549347, with claims in English provided by foreign associate.
Response to Office action filed Aug. 13, 2018 for Chinese application No. 201580017627.0, in Chinese language with claims in English.
Non final office action dated Jun. 27, 2018 for U.S. Appl. No. 14/611,162.
Response to Non final office action filed Sep. 26, 2018 for U.S. Appl. No. 14/611,162.
Response to Office action filed Dec. 18, 2018 for Japan application No. 2016-54927, in Japanese language with claims in English.
Response to 2nd Office Action filed Dec. 25, 2018 for Chinese application No. 201580041059.8, in Chinese language.
Notice of Allowance dated Jan. 24, 2019 for U.S. Appl. No. 14/611,162.
Office Action dated Jan. 11, 2019 for Chinese Application No. 201580017627.0, including translation provided by Chinese associate.
Office action dated Jan. 15, 2019 for Israeli application No. 249091, in Israeli language with a translation provided by the foreign associate.
Notice of Allowance dated Mar. 5, 2019 for JP application No. 2016-549347.
Notice of Allowance dated May 6, 2019 for Chinese Patent Application No. 201580017626.6; in Chinese language only.
Office action dated Jun. 4, 2019 for Chinese application No. 201580041059.8, in Chinese language with a translation provided by the foreign associate.
Response to 1st Office Action filed Jun. 11, 2019 for Japanese application No. 2016-570027, in Japanese language only.
Response to 1st Office Action filed Jun. 11, 2019 for Japanese application No. 2016-570034, in Japanese language only.
Response to OA filed May 13, 2019 for Israeli application No. 249091, in Israeli language with translation provided by foreign associate.
Notice of Acceptance dated Apr. 26, 2019 for Australian Application No. 2015266670.
Response to Examination Report filed May 2, 2019 for Australian application No. 2015210704.
First Examination Report dated May 3, 2019 for Australian Patent Application No. 2015210708.
Office Action dated Jun. 14, 2019 for Chinese Patent Application No. 201580017627.0, including translation provided by Chinese associate.
Office Action dated May 30, 2019 for U.S. Appl. No. 16/261,455.
Notice of Allowance dated Nov. 19, 2019 for U.S. Appl. No. 16/261,455.
Office Action dated Nov. 12, 2019 for Chinese Patent Application No. 201580041033.3, including English translation provided by Chinese associate (7 pages).
Response to Examination Report for European Application No. 15743704.7 filed Dec. 10, 2019, 10 pages.
Response to Examination Report for Australian Application No. 2015210708 filed Dec. 11, 2019, 18 pages.
Office action dated Dec. 12, 2019 for Chinese application No. 201580041059.8, in Chinese language with a translation provided by the foreign associate, 8 pages.
Office Action dated Dec. 12, 2019 for Chinese Patent Application No. 201580017627.0, including English translation provided by Chinese associate, 5 pages.
Response to Office Action filed Jan. 10, 2020 for Chinese Patent Application No. 201580041033.3, no English Translation, (4 pages).
Notice of Acceptance dated Dec. 16, 2019 for Australian Application No. 2015210708.
Notice of Allowance for Japanese Appln. No. 2016-570034 dated Jan. 8, 2020.
Examination Report for New Zealand Application No. 722904 dated Feb. 7, 2020, 2 pages.
Response to Office Action filed Feb. 19, 2020 for Chinese Patent Application No. 201580017627.0, no English Translation, (9 pages).
Office Action dated Jan. 29, 2020 for Japanese Patent Application No. 2019-65723, including English translation, (10 pages).
Cited Ref2 for Japanese Patent Application No. 2019-65723, no English translation, (11 pages).
Notice of Allowance dated Mar. 4, 2020 for U.S. Appl. No. 16/261,455.
Response to Office Action filed Feb. 26, 2020 for Chinese Patent Application No. 201580041059.8, no English Translation.
Office Action dated Feb. 6, 2020 for Korean Patent Application No. 10-2016-7023727, (2 pages).
1st Examination Report for EP Patent Appln. No. 15799774.3 dated Feb. 20, 2020.
Foreign Office Action for Japanese Patent Appln. No. 2016-570027 dated Feb. 10, 2020.
Examiner's Report for New Zealand Appln. No. 722903 dated Feb. 7, 2020.
Response to Examination Report for Australian Application No. 2015266585 filed Apr. 8, 2020, 18 pages.
Response to First Examination Report for New Zealand Application No. 727365 dated Apr. 21, 2020.
Response to First Examination Report for New Zealand Application No. 727361 dated Mar. 9, 2020.
Foreign Office Action for Indian Patent Appln. No. 201647026958 dated Apr. 23, 2020.
Office Action Response filed Apr. 30, 2020 for Japanese Application No. 2016-570027, in Japanese language with claims in English.
Foreign Notice of Allowance for CA Patent Appln. No. 2938264 dated Apr. 9, 2020.
Foreign Office Action for New Zealand Patent Appln. No. 722904 dated May 8, 2020.
Foreign Notice of Allowance for JP Patent Appln. No. 2016-570027 dated May 8, 2020.
First Examination Report dated May 12, 2019 for New Zealand Patent Application No. 722903.
Notice of Acceptance for AU Patent Appln. No. 2015266585 dated May 11, 2020.
Foreign Office Action for KR Patent Appln. No. 10-2016-7023729, dated May 25, 2020.
Foreign Office Action for CN Patent Appln. No. 201580041033.3, dated May 11, 2020.
Foreign Office Action for KR Patent Appln. No. 10-2016-7036877, dated Jun. 19, 2020.

(56) References Cited

OTHER PUBLICATIONS

Extended European Search Report for EP Patent Appln. No. 20173220.3 dated Jun. 18, 2020.
Foreign Office Action Response for Korean Patent Application No. 10-2016-7036877 dated Jun. 19, 2020.
Foreign Office Action for CN Patent Appln. No. 201580041033.3, dated Jul. 15, 2020.
Foreign Examiner's Report for CA Patent Appln. No. 2950429 dated Jul. 9, 2020.
Foreign Office Action Response for European Patent Appln. No. 15799774.3 dated Jul. 1, 2020.
Foreign Response for KR Patent Appln. No. 10-2016-7023729 dated Jul. 27, 2020.
Foreign OA Amendment for KR Patent Appln. No. 10-2016-7036877 dated Aug. 14, 2020.
1st Examination Report for AU Patent Appln. No. 2016262579 dated Jul. 17, 2020.
1st Examination Report for AU Patent Appln. No. 2019219728 dated Aug. 19, 2020.
Foreign Office Action for IL Patent Appln. No. 249089 dated Jul. 7, 2020.
Foreign Notice of Allowance for CA Patent Appln. No. 2938262 dated Aug. 5, 2020.
Foreign Office Action for KR Patent Appln. No. 10-2016-7023729 dated Sep. 14, 2020.
Foreign OA Response for JP Patent Appln. No. 2019-87069 dated Sep. 15, 2020.
Foreign OA Response for KR Patent Appln. No. 10-2016-7036875 dated Sep. 18, 2020.
Foreign Office Action for JP Patent Application No. 2019-108514 dated Sep. 2, 2020.
Foreign Response for NZ Patent Appln. No. 727365 dated Aug. 11, 2020.
Foreign 3rd Patent Exam Report for NZ Patent Appln. No. 727365 dated Sep. 30, 2020.
Non Final Office Action dated July 7, 2020 U.S. Appl. No. 16/373,227 51 pages.
Amendment filed Oct. 7, 2020, U.S. Appl. No. 16/373,227 10pages.
Foreign OA Response for KR Patent Appln. No. 10-2016-7023729 dated Oct. 14, 2020.
Foreign Office Action for JP Patent Appln. No. 2019-65723 dated Sep. 28, 2020.
Foreign Notice of Allowance for KR Patent Appln. No. 10-2016-7036875 dated Oct. 14, 2020.
Foreign OA Response for KR Patent Appln. No. 10-2016-7036877 dated Oct. 16, 2020.
Foreign OA Response for CA Patent Appln. No. 2950429 dated Oct. 26, 2020.
Foreign Notice of Allowance for KR Patent Appln. No. 10-2016-7023729 dated Oct. 21, 2020.
1st Patent Exam Report for NZ Patent Appln. No. 762432 dated Sep. 4, 2020.
Foreign Amendment Response for NZ Patent Appln. No. 727365 dated Oct. 29, 2020.
Foreign OA Response for IN Patent Appln. No. 201647026958 dated Oct. 22, 2020.
Foreign OA for JP Patent Appln. No. 2019-195867 dated Oct. 23, 2020.
Foreign OA Response for KR Patent Appln. No. 10-2016-7036877 dated Nov. 13, 2020.
First Exam Report for AU Patent Appln. No. 2019213313 dated Sep. 8, 2020.
Foreign OA Response for JP Patent Application No. 2019-108514 dated Nov. 25, 2020.
Foreign Final OA for JP Patent Application No. 2019-87069 dated Nov. 4, 2020.
Non-Final Office Action for U.S. Appl. No. 16/123,711 dated Nov. 25, 2020.
Foreign Notice of Allowance for KR Patent Appln. No. 10-2016-7036877 dated Dec. 3, 2020.
Foreign OA Response for JP Patent Application No. 2019-65723 dated Dec. 16, 2020.
Foreign OA Response for JP Patent Appln. No. 2019-195867 dated Dec. 23, 2020.
Foreign Response for AU Patent Application No. 2019280001 dated Dec. 23, 2020.
Foreign Notice of Allowance for JP Patent Appln. No. 2019-108514 dated Dec. 28, 2020.
Foreign Notice of Allowance for CA Patent Appln. No. 2950429 dated Dec. 15, 2020.
Foreign Notice of Allowance for CN Patent Appln. No. 201580041033.3 dated Dec. 16, 2020.
Foreign Response for IL Patent Appln. No. 249089 dated Jan. 3, 2021.
Amendment Response for U.S. Appl. No. 16/123,711 dated Feb. 25, 2021.
Foreign Notice of Appeal for JP Patent Appln. No. 2019-087069 dated Mar. 3, 2021.
Foreign Response for JP Patent Appln. No. 2019-087069 dated Mar. 3, 2021.
Foreign CA for JP Patent Appln. No. 2019-195867 dated Mar. 23, 2021.
Foreign NOA for JP Patent Appln. No. 2019-87069 dated Apr. 8, 2021.
Foreign NOA for JP Patent Appln. No. 2019-65723 dated May 25, 2021.
Foreign Respinse for JP Patent Appln. No. 2019-195867 dated Jun. 11, 2021.
Foreign Response for CN Patent Appln. No. 201910654692.4 dated Jul. 12, 2021.
Foreign OA for CN Patent Appln. No. 201910654692.4 dated Feb. 24, 2021.
Foreign NOA for IL Patent Appln. No. 246995 dated Feb. 17, 2021.
Foreign NOA for IL Patent Appln. No. 246996 dated Feb. 17, 2021.
Foreign NOA for IL Patent Appln. No. 249089 dated Mar. 14, 2021.
Foreign Response for IL Patent Appln. No. 274429 dated Jun. 29, 2021.
Foreign Response for NZ Patent Appln. No. 762432 dated Apr. 1, 2021.
Foreign Resonse for AU Patent Appln. No. 2019213313 dated Apr. 12, 2021.
Foreign Exam Report for CA Patent Appln. No. 2950425 dated Feb. 9, 2021.
Foreign Response for EP Patent Appln. No. 20173220.3 dated Mar. 19, 2021.
Final Office Action for U.S. Appl. No. 16/123,711 dated Apr. 23, 2021.
Foreign Response for CA Patent Appln. No. 2950425 dated May 14, 2021.
Foreign First Exam Report for EP Patent Appln. No. 15743225.3 dated Apr. 29, 2021.
Non-Final Office Action for U.S. Appl. No. 16/794,513 dated Jun. 24, 2021.
Foreign Exam Report for NZ Patent Appln. No. 764960 dated May 26, 2021.
Foreign Exam Report for NZ Patent Appln. No. 764952 dated May 26, 2021.
Foreign Response for AU Patent Appln. No. 2019219728 dated Jun. 28, 2021.
Foreign Exam Report for EP Patent Appln. No. 20173220.3 dated Jun. 16, 2021.
1st Exam Report NZ Patent Appln. No. 764950 dated Jun. 3, 2021.
Foreign Notice of Acceptance for AU Patent Appln. No. 2019219728 dated Jul. 20, 2021.
Response to Final Office Action and RCE for U.S. Appl. No. 16/123,711, filed Jul. 22, 2021.
Notice of Allowance for U.S. Appl. No. 16/640,315 dated Aug. 20, 2021.
Non-Final Office Action for U.S. Appl. No. 16/123,711 dated Sep. 14, 2021.
Foreign NOA for CA Patent Appln. No. 2950425 dated Aug. 20, 2021.

(56) References Cited

OTHER PUBLICATIONS

Foreign Response for EP Patent Appln. No. 15743225.3 dated Sep. 2, 2021.
Amendment Response to NFOA for U.S. Appl. No. 16/794,513 dated Sep. 24, 2021.
Foreign Exam Report for EP Patent Appln. No. 15799569.7 dated Sep. 10, 2021.
Foreign OA for CN Patent Appln. No. 202010405568.7 dated Aug. 25, 2021 (with English translation).
Foreign Response for EP Patent Appln. No. 20173220.3 dated Oct. 22, 2021.
Foreign OA for CN Patent Appln. No. 202110217829.7 dated Sep. 22, 2021.

\* cited by examiner

MULTI-FOCAL DISPLAY SYSTEM AND METHOD

CROSS-REFERENCE TO RELATED APPLICATION(S)

This application is a continuation of U.S. patent application Ser. No. 14/611,154 filed Jan. 30, 2015 entitled "MULTI-FOCAL DISPLAY SYSTEM AND METHOD," which claims priority from U.S. Provisional Patent Application Ser. No. 61/934,565 filed on Jan. 31, 2014 entitled "MULTI-FOCAL DISPLAY SYSTEM AND METHOD,". This application is cross-related to U.S. Provisional Patent Application Ser. No. 62/005,834 entitled "METHOD AND SYSTEM FOR CREATING FOCAL PLANES IN VIRTUAL AND AUGMENTED REALITY," U.S. patent application Ser. No. 14/555,585, entitled "VIRTUAL AND AUGMENTED REALITY SYSTEMS AND METHODS", U.S. Pat. No. 6,046,720, entitled "POINT SOURCE SCANNING APPARATUS AND METHOD," U.S. Pat. No. 7,555,333, entitled "INTEGRATED OPTICAL SCANNING IMAGE ACQUISITION AND DISPLAY," U.S. patent application Ser. No. 11/573,118, entitled "VARIABLE FIXATION VIEWING DISTANCE SCANNED LIGHT DISPLAYS," and U.S. patent application Ser. No. 12/468,832, entitled "SCANNED LASER PROJECTION DISPLAY DEVICES AND METHODS FOR PROJECTING ONE OR MORE IMAGES ONTO A SURFACE WITH A LIGHT-SCANNING OPTICAL FIBER". The content of the aforementioned patent applications is hereby expressly incorporated by reference in its entirety.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

There are numerous challenges when it comes to presenting 3D virtual content to a user of an AR system. A central premise of presenting 3D content to a user involves creating a perception of multiple depths. As in some virtual content appears closer to the user, while other virtual content may appear to be coming from farther away. Thus, to achieve 3D perception, the AR system is configured to deliver virtual content at different focal planes relative to the user.

The U.S. provisional patent applications listed above present systems and techniques to generate various focal planes in the context of AR systems. The design of these virtual reality and/or augmented reality systems presents numerous challenges, including the speed of the system in delivering virtual content, quality of virtual content, eye relief of the user, size and portability of the system, and other system and optical challenges.

The systems and techniques described herein are configured to work with the visual configuration of the typical human to address these challenges.

SUMMARY

Embodiments of the present invention are directed to devices, systems and methods for facilitating virtual reality and/or augmented reality interaction for one or more users. In one aspect, a system for displaying virtual content is disclosed.

In one or more embodiments, an augmented reality system comprises a light projection device operatively coupled to an image source for generating one or more frames of image data, and a composite variable focus element (VFE) system having a first VFE and a second VFE, the first VFE for producing at least two depth planes corresponding to the one or more frames of image data and the second VFE for variably shifting the at least two depth planes at varying distances from the user's eyes.

In one or more embodiments, an augmented reality system comprises an accommodation tracking module to track an accommodation of a user's eyes, a first variable focus element (VFE) to switch between at least two focal planes, and a second VFE to shift the at least two focal planes based at least in part on the tracked accommodation of the user's eyes.

In another aspect, a method of displaying augmented reality comprises providing one or more frames of image data to be presented to a user, transmitting light associated with the one or more frames of image data, focusing a first frame of image data at a first focal plane, focusing a second frame of image data at a second focal plane, and variably shifting the first focal plane and the second focal plane across a range of distances.

Additional and other objects, features, and advantages of the invention are described in the detail description, figures and claims.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are directed to methods, systems, and articles of manufacture for implementing multi-scenario physically-aware design of an electronic circuit design in a single embodiment or in some embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As discussed in U.S. Provisional Application Ser. No. 61/909,774 (now U.S. patent application Ser. No. 14/555,585); U.S. Pat. Nos. 6,046,720; 7,555,333; 7,784,697; and U.S. patent application Ser. Nos. 11/573,118 and 12/468,832, each of which is incorporated by reference herein in its entirety, a variable focus element (hereinafter "VFE") may be used to adjust the wavefront (e.g., focus) of an image in a dynamic fashion, and may be used to generate multi-focal 3D imagery. The VFE may enable analog focus modulation, or may switch between discrete focus states.

The subject of this disclosure is the use of a plurality of VFEs in concert to modulate the focus of images. The use of a plurality of VFEs can enable wavefront modulation characteristics that would be difficult to achieve with a single current state of the art VFE alone. For instance, it can be a challenge to produce a single VFE that simultaneously achieves a large effective aperture, large focus range, low power consumption, and high-speed focus modulation. The use of a plurality of VFEs can enable the advantages of each VFE to be combined, to create a composite VFE system that achieves those criteria.

By placing the VFEs substantially conjugate to an exit pupil in an optical system (such as viewing optics in a near-to-eye display) and/or substantially within a telecentric lens configuration, the VFEs can modulate the focus of an image while maintaining a stable image magnification.

Figure 1:
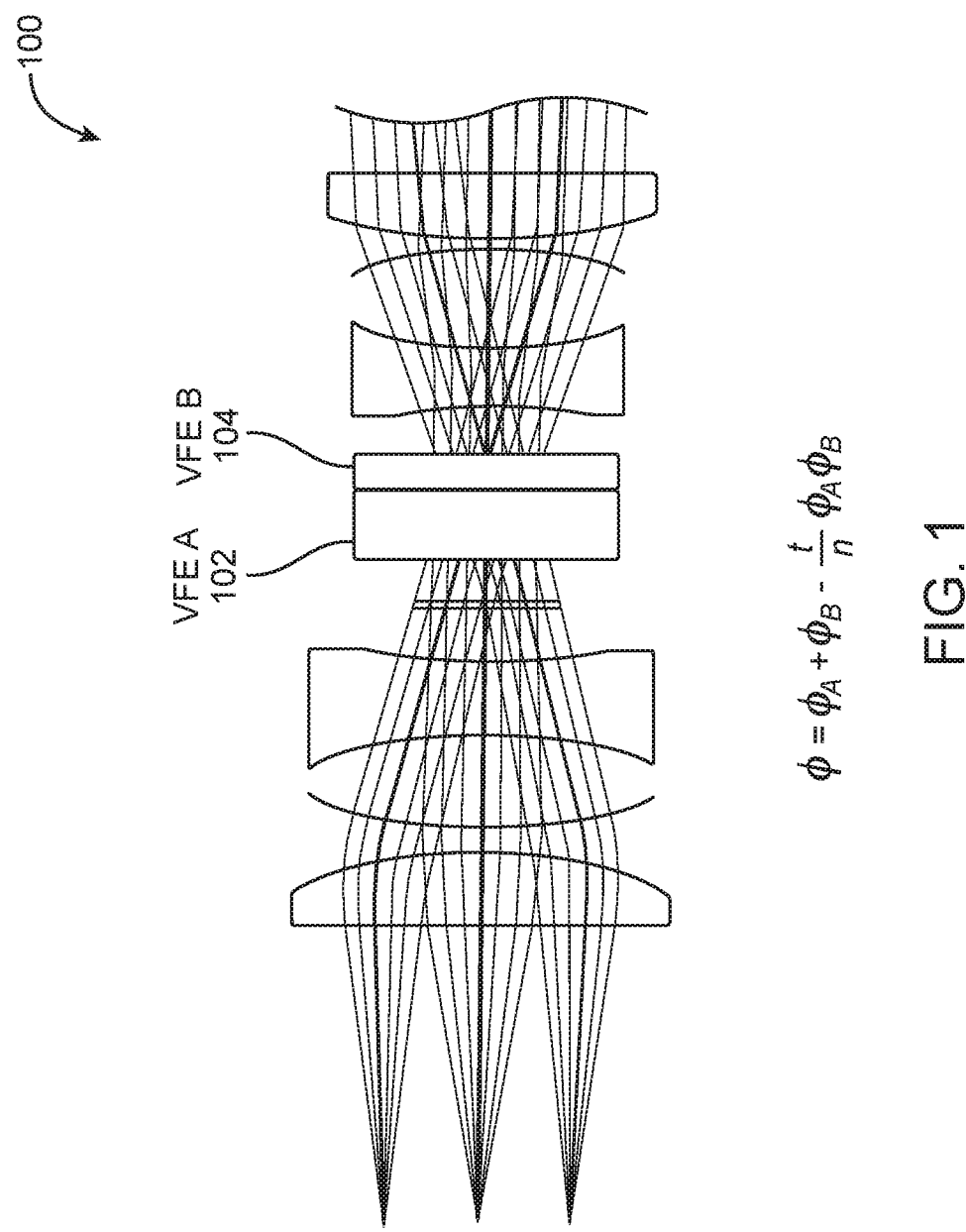
FIG. 1 illustrates a plan view of a long range variable focus element (VFE) and a two state VFE with other optical elements, according to one example embodiment.

FIG. 1 illustrates an example of a portion of one such embodiment, in which the VFEs are placed substantially within a telecentric lens configuration, such that modulation of the VFE generates a change in the focus of incident light, but generates little or no change in image magnification. In this embodiment, two VFEs are shown. The VFE 102 may, for instance, be capable of relative large focus range, such as 0-3 diopters. Such a VFE A 102, may, for the purposes of illustration, be limited in its temporal response time. If used in isolation, such a VFE A 102 may adjust the focus over the course of multiple displayed frames from a operatively coupled image source, but may not be fast enough to modulate between desired focal states on a frame-by-frame basis at the refresh rate of the operatively coupled display; for instance, it may adjust display focus in response to a change in human accommodation or vergence, or in response to the motion of elements within a displayed volumetric scene. The VFE labeled B (104) may comprise a VFE that can switch between focal states more rapidly that VFE A, but may be limited in its total focal range (e.g., 0 to 0.3 diopters) and/or the number of focus states in can produce (e.g., two focus states). By placing VFE A 102 and VFE B 104 in series, their total optical power is combined, such that the focus state of each VFE affects the focus of an operatively coupled display. The relationship may be characterized by an example equation below.

$$\phi = \phi_A + \phi_B - \frac{t}{n}\phi_A\phi_B$$

Figure 2:
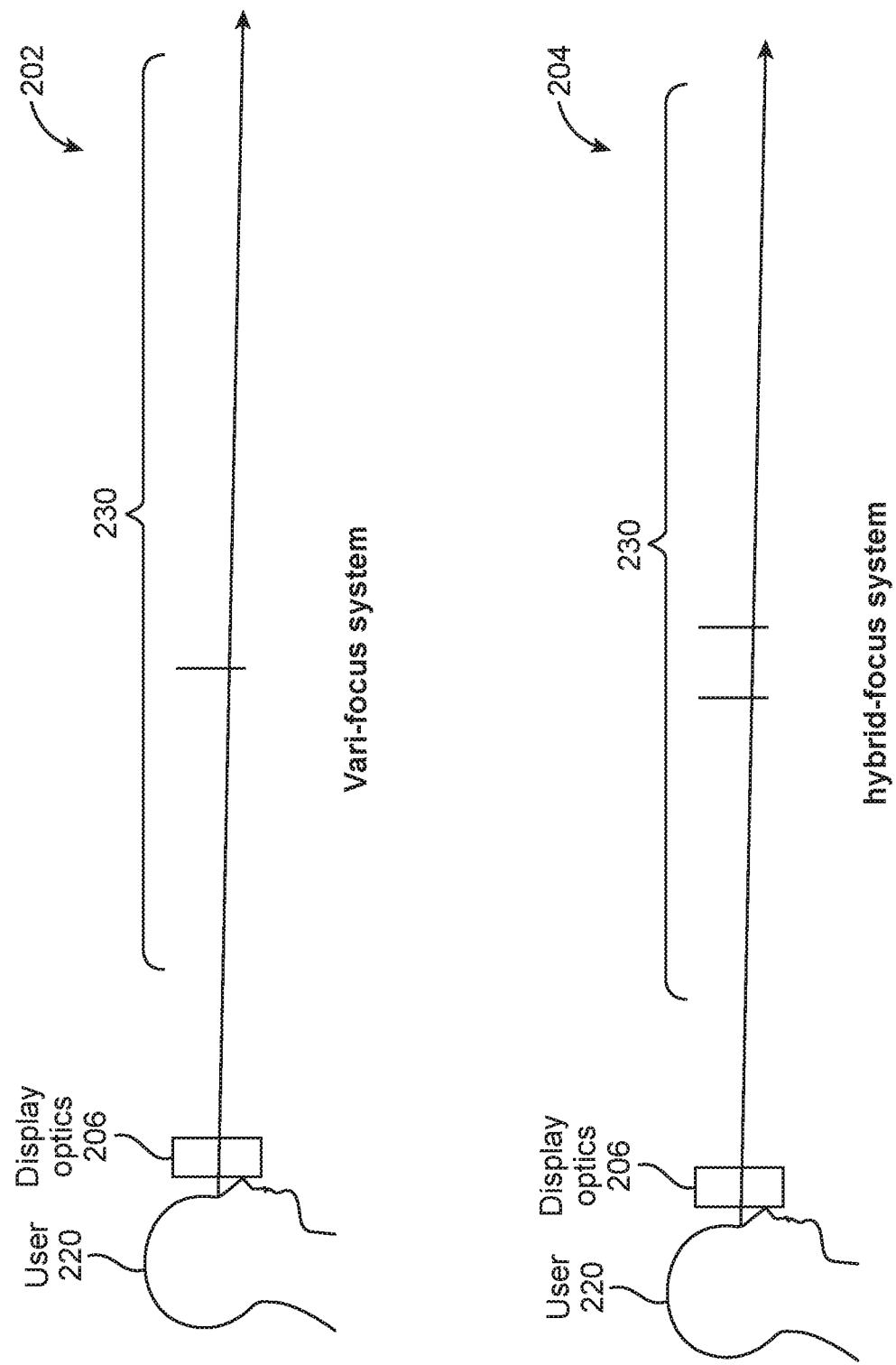
FIG. 2 illustrates a vari-state focus system and a hybrid focus system, according to one example embodiment.

The top portion 202 of FIG. 2, is an example "Vari-focus" system that illustrates a multi-focal display system comprising a single VFE. The optical viewing distance (i.e. the focus distance) or focal plane at which the viewer perceives the virtual image may be varied as shown in FIG. 2. If the single VFE is, for instance, capable of a large focus range but limited in response time, it may be able to modulate the focus of the image in response to a change in a viewer's accommodation or fixation distance within a range 230, but may not be able to switch on a frame-by-frame basis. The bottom portion 204 of FIG. 2 is labeled "hybrid-focus system" and illustrates the viewing condition that can be produced by, for instance, the operation of VFE A and VFE B illustrated in FIG. 1 and described above. By rapidly switching VFE B between two focus states (two focal planes 210), and modulating the focus within the range 230, the persistence of human vision creates the impression in a viewer that he/she is seeing two image planes simultaneously.

By driving an operatively coupled display in synchrony with the VFE B, and displaying one layer of imagery in the even numbered frames and a second layer of imagery in the odd numbered frames, the viewer perceives a multi-focal display, with a relatively small separation between layers. VFE A may be used to shift the closely spaced layers within a larger focus range, over a longer time scale—for instance in response to a change in a viewer's accommodation or fixation distance. By updating the displayed image content in response to a change in a viewer's accommodation or fixation distance, e.g., by re-rendering simulated dioptric blur, the viewer can have the perception that he/she is viewing a multi-focal volumetric image that extends throughout the full focus range supported by the combined optical power of VFEs A and B. The two multiplexed focus states generated by the rapid modulation of VFE B allows the viewer's accommodation to vary within a small range before it is necessary to adjust VFE A, and providing more tolerance to accuracy errors and latency in an operatively coupled accommodation-tracking or eye-tracking system that is used to measure the accommodation or fixation distance of the viewer's eye.

Figure 3:
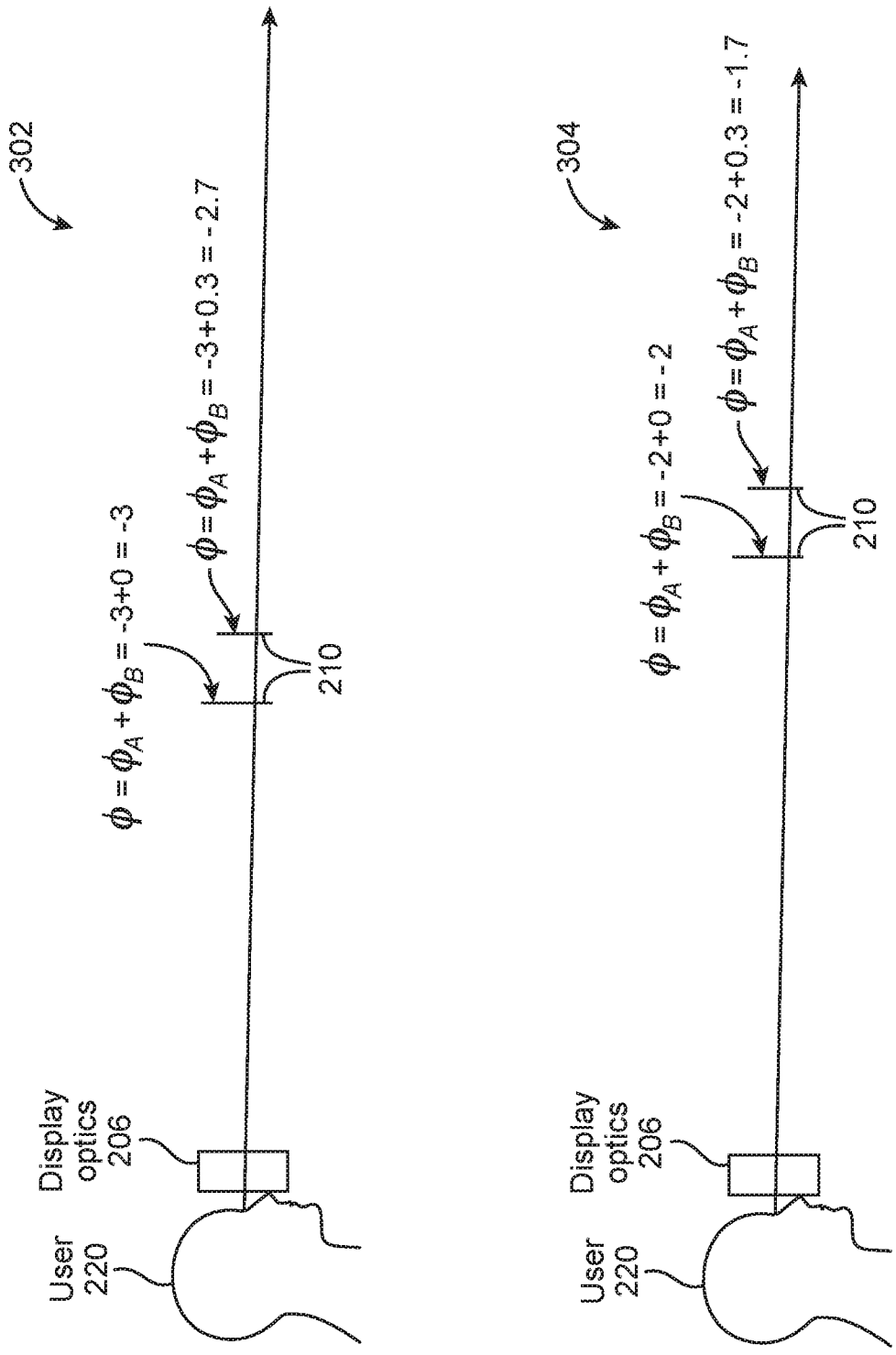
FIG. 3 illustrates an example embodiment of varying focal planes using the hybrid focus system, according to one example embodiment.

FIG. 3 illustrates details of a more specific embodiment, in which VFEs A and B are operatively coupled with a high refresh rate display, such as a Digital Light Projection (DLP) display with a 240 Hz refresh rate. VFE B switches between two focus states (0 and 0.3 diopters) at 240 Hz, and in phase with the DLP refresh, such that all of the even DLP frames are displayed at one optical viewing distance while all of the odd frames are displayed at a different optical viewing distance. By driving the even frames with different image content than the content displayed during the odd frames, one layer of content is positioned at one viewing distance and the other layer of content is positioned at a second viewing distance, and the viewer perceives the two layers to be parts of the same multifocal scene that has an overall effective refresh rate of 120 Hz (240 Hz DLP refresh rate divided by 2 VFE focus states). For instance, the even DLP frames may display an image of a sharply rendered coffee cup, and the odd DLP frames may display an image of a sharply rendered wine glass.

The viewer 220 will perceive a coherent scene containing a coffee cup with a wine glass a small distance behind it. When the viewer looks at the coffee cup, the wine glass will appear slightly blurred, and when he/she shifts eye fixation and accommodation to the wine glass, it will come into sharp focus while the coffee becomes slightly blurred. The top 302 of FIG. 3 shows the two display layers 210 positioned at −3 and −2.7 diopters viewing distance. In our example, the coffee cup would be optically positioned at −3 diopters (i.e., 0.333 meter distance) and the wine glass would be positioned at −2.7 diopters (i.e., 0.370 meter distance). The even and odd DLP frames may each additionally include a somewhat blurred rendering of a flower vase, such that when the viewer gazes at either the coffee cup or the wine glass, he/she will perceive a flower vase in the background of the 3D scene (e.g., at 0.500 meters apparent distance), with the amount of blur that would be expected if it were a real object that were not focused upon at the moment.

If the viewer 220 shifts gaze to the flower vase, an operatively coupled accommodation- and/or eye-tracking system detects the change in focus and triggers a re-rendering of the imagery displayed in the DLP frames, such that the flower vase is rendered in sharp focus, while the coffee cup and wine glass are rendered with some blur. The tracking system also triggers VFE A to shift the two closely spaced focus layers 210 produced by VFE B to the area where the flower vase should reside. The bottom 304 of FIG. 3 illustrates that VFE A has shifted focus state such that the two focus planes produced by VFE B are now at −2 and −1.7 diopters (0.500 meters and 0.588 meters). Now the viewer will have the perception that he/she is looking at the flower vase, it is in sharp focus, and the coffee cup and wine glass are each somewhat blurred.

Though the illustrated examples primarily address a 2 VFE system, any number of VFEs may be used. For instance, a 3 VFE system may be used to achieve a longer total focus range or a larger number of discrete focus states. Also, though the FIG. 1 shows the VFEs in close proximity, they may alternatively be distributed across an optical system. For instance, VFEs may be placed at optically conjugate locations, such that the focus state of each VFE may be modulated without changing the image magnification of an operatively coupled display.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The invention claimed is:

1. A display system, comprising: a light projection device operatively coupled to an image source that generates image data for viewing by a user through a display; and a composite variable focus element (VFE) assembly operatively coupled to the light projection device, the composite VFE assembly comprising a first VFE and a second VFE, wherein the first VFE and the second VFE are arranged in series, the first VFE is configured to switch between focal states within a first focal range with a first switching response time, the second VFE is configured to switch between focal states within a second focal range with a second switching response time, wherein the first switching response time of the first VFE is slower than the second switching response time of the second VFE, the second VFE is configured to generate a pair of focal planes comprising a first focal plane and a second focal plane by switching between a first focus state of the first focal plane and a second focus state of the second focal plane with the second switching response time of the second VFE, wherein the second focal range of the second VFE is defined between the pair of focal planes generated by the second VFE, and the first focal range encompasses each possible position of the pair of focal planes generated by the second VFE, and the first VFE is configured to modulate a focus of the pair of focal planes generated by the second VFE by shifting the pair of focal planes generated by the second VFE at varying distances relative to eyes of a user of the display system and within the first focal range of the first VFE with the first switching response time to create an impression that the user is seeing the first image plane and the second image plane simultaneously within the first focal range of the first VFE as the pair of focal planes generated by the second VFE is moved within the first focal range of the first VFE;

wherein the first focal range is multiple times larger than the second focal range;

wherein the first focal range is 0 to 3 diopters, and the second focal range is 0 diopters to 0.3 diopters.

2. The display system of claim 1, further comprising a telecentric lens system, wherein the composite VFE is disposed within the telecentric lens system such that modulation of the composite VFE generates a change in the focus of incident light, while generating little or no change in image magnification.

3. The display system of claim 1, wherein the first switching response time of the first VFE is less than a refresh time of the light projection device.

4. The display system of claim 1, wherein the composite VFE is configured to display images at a first focal distance in even numbered frames and to display images at a second focal distance in odd numbered frames such that a viewer perceives a multi-focal display.

5. The display system of claim 1, wherein the second VFE is configured to display a first image at a first focal distance in a first frame and to display a second image at a second focal distance in a second frame.

6. The display system of claim 5, wherein the first VFE is configured to focus the first and second images to respective third and fourth focal distances.

7. The display system of claim 6, further comprising an accommodation-tracking system configured to measure a viewer's accommodation, wherein the third and fourth focal distances are determined based at least in part on a change in the viewer's accommodation.

8. The display system of claim 6, further comprising an eye-tracking system configured to measure a viewer's fixation distance, wherein the third and fourth focal distances are determined based at least in part on a change in the viewer's fixation distance.

9. The display system of claim 1, wherein the second VFE increases a tolerance of the display system to accuracy errors and latency in an operatively coupled accommodation-tracking or eye-tracking system.

10. The display system of claim 1, wherein the light projection device is a Digital Light Projection (DLP) display with a refresh rate.

11. The display system of claim 10, wherein the second VFE switches between the first focus state and the second focus state at the refresh rate of the DLP display and in phase with a refreshing of the DLP display such that even numbered image frames are displayed at the first focal state and odd numbered image frames are displayed at the second focal state.

12. The display system of claim 11, wherein the image source generates first layer image content at first viewing distance for the even numbered image frames and second layer image content at second viewing distance for the odd numbered image frames such that a viewer perceives the first and second layer image content to be parts of a multifocal scene.

13. The display system of claim 12, wherein the refresh rate of the DLP display is 240 Hz, and wherein the display system has an overall effective refresh rate of 120 Hz.

14. The display system of claim 1, wherein a total optical power of the composite VFE is a combination of a first optical power of the first VFE and a second optical power of the second VFE.

15. The display system of claim 14, wherein a first distance between the first focal plane and the second focal plane is based at least in part upon a constant optical power difference comprising a difference between the first optical power of the first VFE and the second optical power of the second VFE.

* * * * *